2 Sheets—Sheet 1.

G. A. ELLIS.
SULKY-PLOWS.

No. 195,494. Patented Sept. 25, 1877.

Witnesses
Saml. J. Van Stavoren
Jos. B. Connolly

Inventor
George A. Ellis
Connolly Bros.
Attorneys

N. PETERS, PHOTO-LITHOGRAPHER, WASHINGTON, D. C.

2 Sheets—Sheet 2.
G. A. ELLIS.
SULKY-PLOWS.
No. 195,494. Patented Sept. 25, 1877.
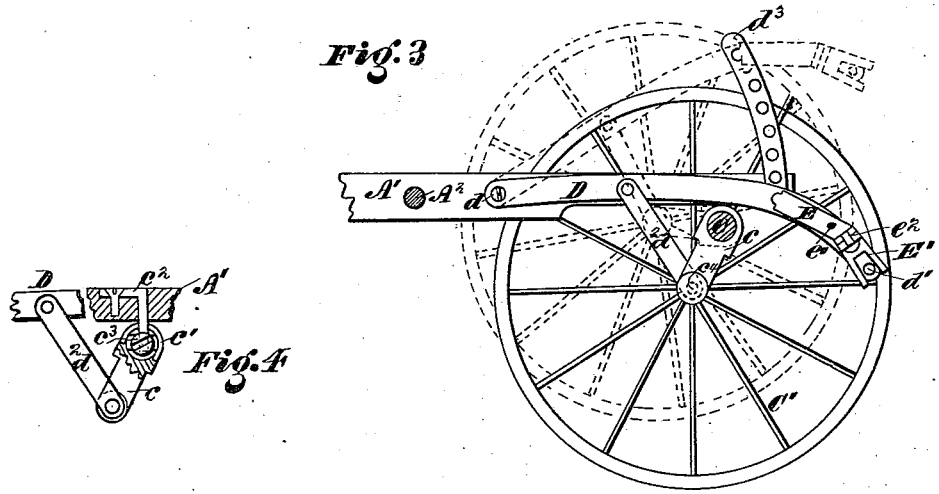
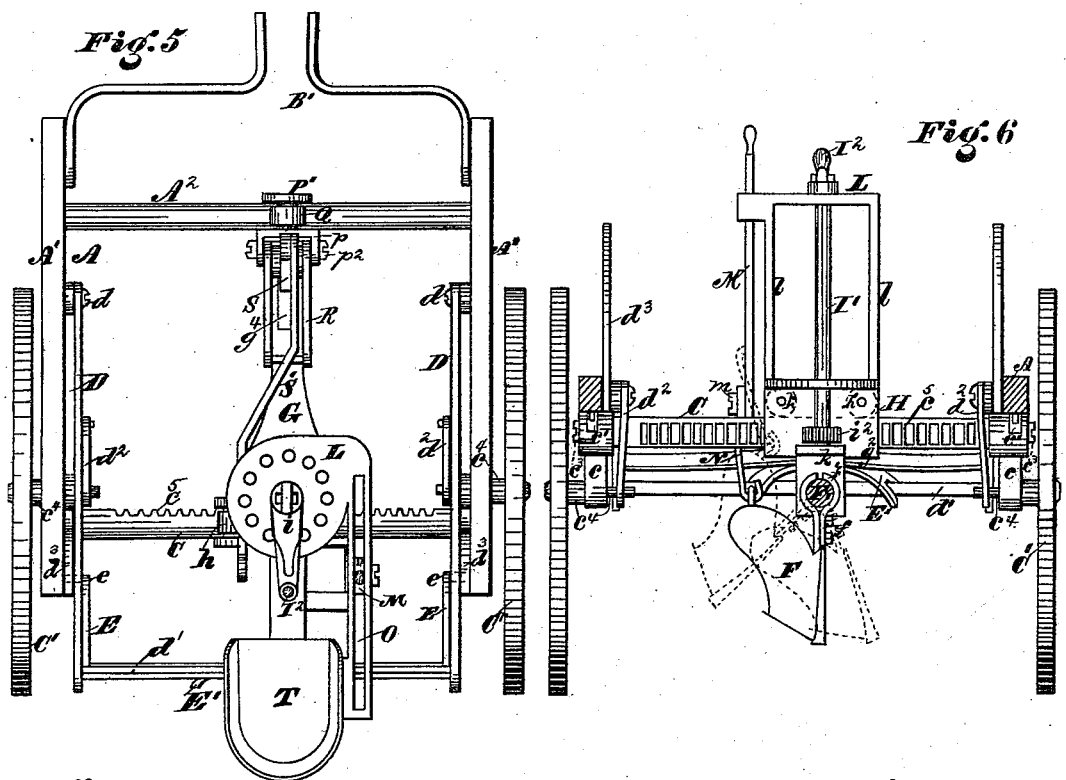
Witnesses
Saml. J. Van Stavoren
Jos. B. Connolly
Inventor
George A. Ellis
Connolly Bros.
Attorneys

UNITED STATES PATENT OFFICE.

GEORGE A. ELLIS, OF PHILADELPHIA, PENNSYLVANIA, ASSIGNOR OF ONE-HALF HIS RIGHT TO THOMAS L. RICART, OF SAME PLACE.

IMPROVEMENT IN SULKY-PLOWS.

Specification forming part of Letters Patent No. 195,494, dated September 25, 1877; application filed March 20, 1877.

*To all whom it may concern:*

Be it known that I, GEORGE A. ELLIS, of Philadelphia, in the county of Philadelphia and State of Pennsylvania, have invented certain new and useful Improvements in Sulky-Plows; and I do hereby declare the following to be a full, clear, and exact description of the invention, such as will enable others skilled in the art to which it pertains to make and use it, reference being had to the accompanying drawings, which form part of this specification, in which—

Figure 1:
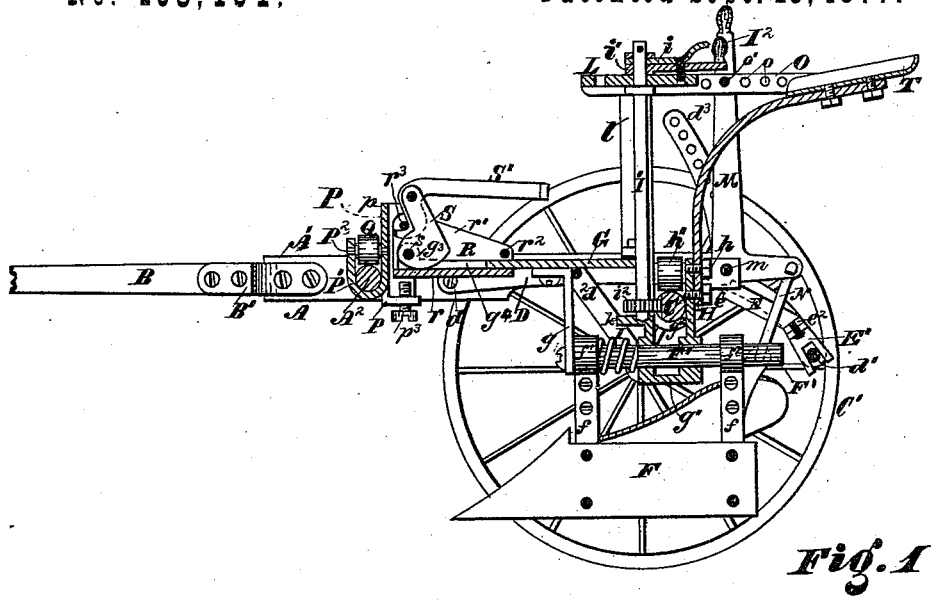
Figure 2:
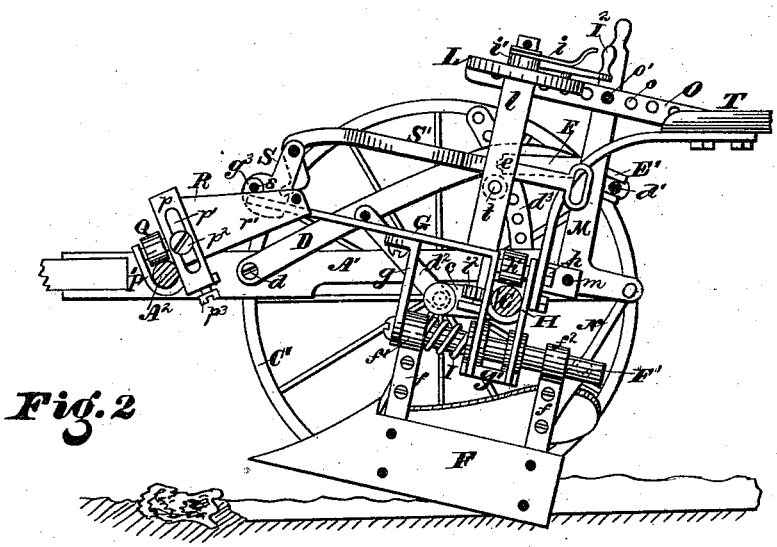

Figures 1 and 2 are longitudinal vertical sections. Figs. 3 and 4 are detail vertical sections. Fig. 5 is a plan, and Fig. 6 a front, view.

My invention has for its object to provide a sulky-plow having the several adjustments hereinafter set forth.

My improvements consist of the means provided for securing said adjustments, and in the peculiar construction and combination of parts hereinafter fully described.

Referring to the accompanying drawing, A designates a frame, composed of the two side bars $A^1$ $A^1$, and cross-rod or beam $A^2$. B represents the tongue, secured in a yoke, $B'$; and C, the axle, mounted on wheels $C'$ $C'$. From each end of said axle proceeds a crank-arm, $c$, said arms having openings for the passage of the ends of the axle, and slots $c^1$, through which pass, into the axle, bolts $c^2$. Said bolts proceed from the bars $A^1$ $A^1$, and are fastened in the axle C by screws $c^3$ in the ends of the latter. $c^4$ represents short axles or winches, fast in the arms $c$, and on which are loosely swiveled the wheels $C'$ $C'$.

D D are arms, pivoted at $d$ $d$ to the bars $A^1$ $A^1$, and united at their rear ends by a rod, $d^1$. $d^2$ $d^2$ are arms pivotally connected with the short axles $c^4$ and bars D D, so that when said bars swing up or down on their pivots the cranks $c$ $c$ will be turned, and the frame A raised or lowered on the wheels $C'$ $C'$.

$d^3$ $d^3$ are segmental standards on the frame A A, having adjusting-holes for the entrance of pins $e$ on the ends of the levers E E, which are pivoted on the bars D D at $e^1$ $e^1$, and to each other at $e^2$, where they are secured to a curved spring, $E'$, having bifurcated ends, which straddle the rod $d^1$.

F represents the plowshare, having standards $f$ $f$, which terminate in sleeves $f^1$ $f^2$, which slide on a horizontal bar or beam, $F'$, said bar being fastened to a strap, $g$, and passing through a hanger, $g^1$, which depends from a platform, G. The rear end of the platform G is bent to form or secured to straps $g^2$ $g^2$, which pass around the axle C, and are then secured to a transverse bar, H, by screws or bolts $h$ $h$, forming shafts for rollers $h'$ $h'$, which rest upon said axle C.

Between the sleeve $f^1$ and hanger $g^1$ is a coiled spring, I, surrounding the bar $F'$, and serving as a buffer to take up any shock or jar occasioned by the plow-point meeting a stone, root, or other obstruction of such nature.

$I^1$ represents a crank-shaft, passing through the platform G and sustained on the step $k$, projecting from the strap $g^2$.

L represents a disk sustained upon standards $l$ $l$, which rise from the platform G, said disk having openings for the reception of a pin on the end of a spring-dog, $i$, secured to a crank-arm, $i^1$, fast on the crank-shaft $I^1$. $i^2$ is a pinion fast on the lower end of the shaft $I^1$, and meshing with a rack, $c^5$, formed on the axle C.

On turning the shaft $I^1$ by means of its handle $I^2$, the carriage, consisting of the platform G and appurtenant parts, will be moved toward either side of the frame A, carrying with it the plowshare F.

M represents an elbow-lever, pivoted at $m$ to the bar H, and connected to the share F by a rod, N. The upper end of said lever passes through a slotted plate, O, having adjusting-holes $o$ and retaining-pin $o'$. By moving said lever backward and forward, the plowshare F may be swung to either side, the sleeves $f^1$ $f^2$ turning on the horizontal bar $F'$.

P represents a vertical plate, having cheek-pieces $p$ $p$, slotted at $p^1$ $p^1$, for the passage of adjusting-screws $p^2$. $P^1$ is a clip, formed by bending the extended end of the plate P around the transverse bar $A^2$.

$P^2$ represents a screw passed through said clip and plate, and forming a shaft for the roller Q, which runs upon the bar $A^2$.

R shows a bracket, composed of the bottom plate $r$ and sides $r^1 r^1$, the latter being connected by rods $r^2 r^3$. Said bracket is secured to the plate P by the screws $p^2$, being adjusted by the screw $p^3$, and receives the diminished forward end of the platform G.

Said forward end of the platform G is slotted at $g^4$, for the passage of an eccentric elbow-crank, S, pivoted at $s$ to uprights $g^3$ on said platform.

S' is a lever, extending from the upper extremity of said crank backwardly to a position within easy reach of the driver mounted on the seat T, being adapted to have its rear end fastened beneath a stud, $t$, projecting from one of the standards $l$.

The operation is substantially as follows: To elevate the plowshare when going to work, or for the purpose of passing over a stone or other obstruction, the bars D are depressed at their rear end by the driver's foot pushing down the spring-levers E, releasing the pins $e e$ on the ends of the said levers E E from engagement with the standards $d^3 d^3$. Continuing the pressure to overcome the weight of the plowshare, said bars are depressed until the pins on the spring-levers E E enter the lowest holes in the standards $d^3$. The plow is then sustained in its most elevated position, clear of the ground. To lower the plow, the driver depresses the levers E E sufficiently to release the pins $e$ from engagement with the standards, and, still holding his foot on said levers, permits the plow to descend by its own gravity, raising the rear end of the bars D. When the plow has descended as far as it is desired to have it go, the spring-levers E E are released, their pins $e$ entering the openings in the standards $d^3$, with which they then register. To cause the share F to swing to either side to clear an obstruction, the lever M is moved backward or forward in the slotted plate O. To move the plow and appurtenant parts to either side of the frame A, the shaft $I^1$ is turned by means of the handle $I^2$. To raise the point of the plow, the lever S' is lifted from its place under the stud $t$, and then drawn toward the driver until its forwardly-hooked end is released from engagement with the rod $r^3$. Continuing the draft upon said lever, the eccentric crank S is rocked upon the bottom of the bracket R until the point of the plow is sufficiently raised to ride over an obstruction. To lower the point, the operation just described is reversed. This raising and lowering of the point also affords means for regulating the depth of the furrow to be made by the plow. The lateral movement of the share permits the ground, near a fence, for instance, on either side, to be plowed close up to the wheel, where, if the share were hung fixedly in the middle of the frame, such close plowing could not be accomplished.

What I claim as my invention is—

1. In combination with the bars D D, arms $d^2$, and standards $d^3$, the levers E, rod $d$, and spring E', substantially as shown and described.

2. In combination with the frame A and axle C, the crank $c$, having openings for the journal-axles, and slots $c^1$, and being secured to said frame and axle, respectively, by means of bolts $c^2$ and screws $c^3$, substantially as shown and described.

3. The plowshare F, hung upon the beam or bar F', substantially as described, so as to slide or move longitudinally thereon.

4. In combination with the share F, beam F', and standards $f f$, the buffer-spring I, for the purpose described.

5. In combination with the beam F', arranged at a right angle with the axis of the wheels C', the plowshare F, suspended from said beam by the standards $f f$, and arranged to swing upon said beam, substantially as described and shown.

6. In combination with the beam F', plowshare F, and standards $f f$ turning on the beam, the elbow-lever M and connecting-rod N, said connecting-rod being arranged, substantially as described, so as to permit free lateral movement of the share, for the purpose set forth.

7. In combination with the rolling or sliding platform G and axle C, having a rack, $c^5$, the crank-shaft $I^1$ and pinion $i^2$, substantially as shown and set forth.

8. In combination with the transverse bar $A^2$ and platform G, the sliding or rolling carriage, composed of the plate P, strap $P^1$, and roller Q, substantially as shown and described.

9. In combination with the carriage P and platform G, the vertically-adjustable bracket R, substantially as shown and described.

10. The combination, with the bracket R and platform G, of the eccentric crank S and lever S', arranged and operating, substantially as shown and described, to raise and lower the point of the plow-share F.

In testimony that I claim the foregoing I have hereunto set my hand this 2d day of February, 1877.

GEORGE A. ELLIS.

Witnesses:
M. DANL. CONNOLLY,
CHAS. F. VAN HORN.